Patented Nov. 6, 1928.

1,690,640

UNITED STATES PATENT OFFICE.

EMIL KRAUS, OF THE HAGUE, NETHERLANDS, ASSIGNOR TO FABRIEK VAN CHEMISCHE PRODUCTEN, OF SCHIEDAM.

MANUFACTURE OF SULPHURIZED DERIVATIVES OF PHENOLS.

No Drawing. Application filed February 16, 1926, Serial No. 88,704, and in the Netherlands August 5, 1925.

The invention relates to the manufacture of sulphurized derivatives of phenols, which term includes phenol, its homologues, substitution products and analogues as well as mixtures of two or more of such compounds. As homologues of phenol there may be mentioned, for example, the cresols and the xylols, as substitution products, the chlorophenols, and as analogues the napthols.

It is known that by heating sodium phenolate with sulphur, a small quantity of dioxydiphenylsulphide is produced, together with a large quantity of resinous by-products which are of little value. It is also known that sulphurized derivatives of phenols are obtained by heating the phenol with sulphur in the presence of an aqueous solution of an alkali.

By the present invention, new products of very good quality containing sulphur are obtained directly in a useful condition by heating a dry alkali metal salt of a phenolic body with sulphur in a non-aqueous medium. The medium may be an inert liquid in which the phenolate is suspended or dissolved, but preferably it is a phenol itself. In this case the phenol not only acts as a solvent but also takes part in the reaction; thus only a small fraction of the total quantity of alkali required to convert all the phenol into alkali metal phenolate is sufficient to cause a reaction between the phenol and the added sulphur.

By a further feature of the invention the new product so obtained may be further converted into other useful products by treatment with an aldehyde, for instance, formaldehyde or acetaldehyde, and a sulphite.

The products obtainable according to the invention are useful as mordants for basic dyestuffs and as reserves in dyeing textiles; those products obtained by an after-treatment with an aldehyde and a sulphite are also useful for tanning purposes. The products are useful as mordants in dyeing cotton and other kinds of cellulose with basic dyestuffs, and they may advantageously be substituted for tannin and tartar emetic.

In carrying out the invention a practicable method is to add to a phenol a quantity of a caustic alkali solution insufficient to convert the phenol into an alkali metal phenolate and then boil the mixture until the water originally present in the alkali solution and formed during the reaction is expelled and a dry alkali metal phenolate is obtained, dispersed in the excess of phenol. Sulphur is then added and the mixture is heated until the desired product is obtained. To ascertain whether the desired product has been obtained, a sample may be taken from the molten mass and tested for its power of fixing basic colors on cotton. If the same shows the property of fixing basic colors on cotton, the reaction may be considered complete. The product solidifies on cooling and is then preferably subdivided to a powder.

The relative quantities of phenol, alkali and sulphur may be varied within wide limits. It is however preferable to use only so much alkali that the dry alkali salt remains entirely dissolved in an excess of phenol. The quantity of sulphur is preferably between one and two atomic proportions for every molecular proportion of phenol. The mixture is heated until the reaction is completed; during the reaction large quantities of sulphureted hydrogen are evolved. The reaction which is completed when the desired product is obtained, generally requires some hours at a temperature of about 180° C. and a still longer period when conducted at a lower temperature. The products obtained are soluble in water, and may be precipitated from the solution by addition of an acid. The products thus precipitated are more or less soluble in organic solvents, such as alcohol and acetone.

Alkaline solutions of the new products possess the property of becoming fixed on cotton and other kinds of cellulose, practically without production of colour, and of fixing basic dyestuffs thereon in clear tints.

As the new products do not yield on reduction 1-2-phenol-thiol it must be concluded that the binding of several molecules does not take place with formation of disulphide, but with the formation of sulphide or with condensation to larger molecules by formation of other chains, which confer the valuable properties upon the product. The product is probably not a chemical individual but a complicated mixture.

As the process is easily and simply carried out, the products are cheap and may be further improved without rendering the process too expensive. For this purpose they may be stirred at ordinary temperature in a finely subdivided condition (or after having been soaked in water at about 40–50° C.) with water and a sulphite, whilst adding an aliphatic aldehyde such as acetaldehyde or formaldehyde. After well stirring a thin or viscous solution is obtained, according to the quantity of water employed. This solution however still yields a precipitate on addition of an acid. When this solution however is heated to a moderate temperature, (for example at 70–90° C.) a stage is soon reached (for example after ½–2 hours) at which a sample suitably diluted with water, no longer gives a precipitate on the addition of an acid.

New products can now be obtained from the solution by salting out, preferably after neutralizing or partly neutralizing the solution; or the neutralized solution may be evaporated to dryness. Or the concentrated solution may be used directly, in which case it may if required be neutralized immediately before use.

Regarding the quantities of sulphite and aldehyde which may be used it is sufficient to use ½ to 1 molecular proportion of each per molecular proportion of phenol originally used for the sulphurization. The heating of the condensation solutions is not prolonged further than is necessary for obtaining a product of suitable solubility; if the heating be continued for a longer time gelatinous and finally insoluble products are produced. Instead of sulphurized phenols (derived from phenol, its homologues, and substitution products) sulphurized naphthols may also be used. Valuable products also are obtained by starting with a mixture of phenols; for example: phenol or $\beta$-naphthol is first dissolved in an equivalent quantity of NaOH, another phenol is then added and the water removed by distillation, whereupon, the mixture is heated with sulphur and thereafter condensed with a sulphite and an aldehyde.

The following examples illustrate the invention:—

*Example 1.*—20 kilos of NaOH are added to 188 kilos of molten phenol and the water produced by the reaction is distilled off, while stirring, by heating to 180° C. After cooling to 160° C. 125 kilos of sulphur are added in portions during a few hours, and the mixture is heated while stirring, for 6 to 24 hours to 160°–180° C., during which period large quantities of hydrogen sulphide are evolved and the molten mass gradually becomes viscous. The molten mass is then poured out and allowed to harden. After cooling it is a yellowish glassy mass, which can easily be ground, and is then ready for technical use. The reaction may also be conducted at a lower temperature than 180° C., for example, 140°–150° C., in which case, however, the sulphurization takes a somewhat longer time. If instead of 125 kilos, only 90 kilos of sulphur are used, a product is obtained, which on precipitation by an acid is more soluble in acetone and alcohol than is the product obtained according to this example from 125 kilos of sulphur.

*Example 2.*—188 kilos of phenol are dissolved in about 500 kilos of solvent naphtha (boiling point 150°–160° C.) 80 kilos of powdered NaOH are added and the mixture is heated while stirring until no more water distils; the solvent naphtha which distils is returned to the mixture. The sodium salt of the phenol is thus obtained precipitated in the naphtha in the form of a fine paste. 100 kilos of sulphur are then added and the mixture is boiled for about 50–60 hours in a reflux apparatus. The sulphurized product separates during this operation as a viscous mass. After cooling the solvents naphtha is allowed to drain away, the residual naphtha is removed by steam, and from the solution thus obtained the sulphurized product is precipitated by addition of an acid. When precipitated from a hot solution, it separates as a yellow resin which hardens on cooling. The properties of this product resemble those of the product obtained as described in Example 1.

*Example 3.*—214 kilos of commercial cresol (i. e. cresol which has been purified by a single distillation) are heated with 20 kilos of NaOH and 125 kilos of sulphur in the manner described in Example 1. A product is obtained which likewise has the property of becoming fixed on cotton without discoloration.

*Example 4.*—188 kilos of phenol are heated with 20 kilos of powdered NaOH, while stirring, at 180° C. until all the water has distilled. The mass is then allowed to cool to 130–140° C. and 130 kilos of sulphur are added in portions while continually stirring. A vigorous evolution of hydrogen sulphide instantly occurs. When the foaming has subsided somewhat, the mixture is heated to 170–180° C. and maintained at this temperature for about six hours, until evolution of hydrogen sulphide has nearly ceased, and the mass has become moderately viscous. On cooling the reaction product becomes hard and can be powdered. The powdered mass (amounting to about 270 kilos) is then stirred with 500 kilos of water, 270 kilos of crystallized sodium sulphite are added and 80 kilos of formaldehyde of 40 per cent strength (i. e. about ½ a molecular proportion) are allowed to flow into the mixture. The mass, which at first has become resinous, dissolves on kneading for a short time at ordinary temperature, more rapidly, however, if heated to 40–50° C., to form a clear, brownish solution, which yields a heavy precipitate on addition of an acid even after being strongly diluted with water. The solution is then heated for some time at 70–90° C.; after heating for 1–2 hours a diluted sample no longer gives a precipitate with an acid. The solution so obtained may be used directly for tanning purposes after first being carefully neutralized. The reaction product may, however, be precipitated from the neutralized solution by means of salt, or the neutralized solution may be evaporated to dryness. An alkaline solution of the reaction product is an excellent mordant for fixing basic dyestuffs, on cotton and the like and may be used also as a reserve. The neutral solution is an excellent tanning agent. To prepare a solution which may be used directly it is advisable to work with concentrated ingredients but the same product is formed if a much more dilute solution is treated, until a sample diluted with more or less water does not yield a precipitate with an acid.

Instead of the sulphurized phenol obtained as above described there may be used in the same manner substances which are formed, either when the quantity of NaOH is increased, for example up to 40 kilos, or when the quantity of sulphur is reduced to one half or to one quarter of the amounts specified. The quantities of the formaldehyde and sulphite may likewise be varied between wide limits. Instead of ½ molecular proportions, 1 molecular proportion of formaldehyde, i. e. double the quantity above specified may take part in the reaction, a correspondingly larger quantity of sulphite being used.

Instead of phenol itself there may be used a homologue or substitution product thereof, and in the place of the formaldehyde other aldehydes may be used. By using for instance an equivalent quantity of acetaldehyde instead of the formaldehyde used, similar results are obtained.

*Example 5.*—216 kilos of commercial cresol are fused with 20 kilos of NaOH and the water is distilled away; thereupon 96 kilos of sulphur are added in portions and the whole is heated at 140–160° C. until the evolution of hydrogen sulphide has almost ceased (12–20 hours). A feebly reddish-brown product is formed, which fixes almost without discoloration on cotton. The product obtained (amounting to about 280 kilos) which as a rule is somewhat viscous and hygroscopic when cold, is stirred at 35–40° C. with 500 litres of water and 500 kilos of crystallized sodium sulphite whereupon a viscous resin separates from the liquid. 160 kilos of formaldehyde of 40 per cent strength are allowed to flow into the mixture and after stirring for a short time the matter which has separated is re-dissolved. The solution is then heated to 70–85° C. for about three hours after which a sample no longer yields a precipitate with acid. As the parent material is the cheapest phenolic body available, the product is a valuable and inexpensive mordant and on account of its exceedingly high tanning capacity it is a particularly valuable artificial tanning agent. Instead of the mixture of commercial cresol the separated isomeric products separated therefrom or mixtures thereof with ordinary phenol may be used. In the sulphurizing process the variations referred to in Example 1 may also be applied. When using acetaldehyde instead of formaldehyde similar products are obtained.

*Example 6.*—72 kilos of β-naphthol are melted with 47 kilos of phenol; 20 kilos of NaOH (preferably used in the form of a concentrated solution) are then added and the water is distilled away by heating at 180° C. After cooling to about 130° C. about 80 kilos of sulphur are added and the mixture is heated at at 170–175° C. for 12–15 hours. The mass which is finally obtained is very viscous, and may be pulverized when cold. The powdered reaction product is stirred with 1500 litres of water, 270 kilos of crystallized sodium sulphite are added and the whole is agitated until all is dissolved; 80 kilos of formaldehyde of 40 per cent strength are then allowed to flow into the solution, and after stirring for about 2–3 hours, all is dissolved. The solution, however, still yields a heavy precipitate on addition of acetic acid. After being heated for an hour at 80–85° C. a diluted sample no longer gives a precipitate with acid. The solution obtained may either be used directly for tanning, or the reaction product may be caused to separate by the addition of salt. Instead of the mixture above referred to also other phenols or their analogous, homologues or substitution products or mixtures thereof in all proportions may be used. Likewise the sulphurization and the condensation may be varied in the manner prescribed in Example 1.

What I claim is:

1. In the manufacture of sulphur derivatives of phenols, the process which comprises adding to a phenol a quantity of alkali sufficient to convert more than approximately one-fourth of the phenol into alkali phenolate but insufficient so to convert the whole of the phenol, heating the mixture until free from water, adding from 1 to 2 atomic proportions of sulphur for each molecular proportion of the total phenol present and heating the mixture for a sufficient time to a reacting temperature above 100° C. but insufficiently high to substantially decompose the desired product, until a product is obtained whose solution in an alkali has the property of fixing basic colors on cotton.

2. In the manufacture of sulphur derivatives of phenols, the process which comprises adding to a phenol a quantity of alkali sufficient to convert more than approximately one-fourth of the phenol into alkali phenolate but insufficient so to convert the whole of the phenol, heating the mixture until free from water, adding one to two atomic proportions of sulphur for each molecular proportion of the total phenol present, and heating the mixture for some hours to a temperature above 160° C. but insufficiently high to substantially decompose the desired product.

3. In the manufacture of sulphur derivatives of phenols, the process which comprises adding to a mixture of phenols a quantity of alkali sufficient to convert more than approximately one-fourth of the phenol into alkali phenolate but insufficient so to convert the whole of the phenol, heating the mixture until free from water, adding from 1 to 2 atomic proportions of sulphur for each molecular proportion of the total phenol present and heating the mixture for some hours to a temperature above 160° C. but insufficiently high to substantially decompose the desired product.

4. In the manufacture of new derivatives of phenols, the process which comprises heating an alkali phenolate with sulphur in the absence of water and in a non-aqueous liquid and treating the obtained sulphurized derivatives with a lower aliphatic aldehyde and a soluble sulphite.

5. In the manufacture of new derivatives of phenols, the process which comprises heating an alkali metal phenolate in the absence of water and in a non-aqueous liquid with between 1 and 2 atomic proportions of sulphur for every molecular proportion of phenol, and treating the obtained sulphurized derivatives with a lower aliphatic aldehyde and a soluble sulphite until a sample of the reaction mixture when diluted with water no longer yields a precipitate on addition of acid.

6. In the manufacture of new derivatives of phenols, the process which comprises preparing a solution of an alkali metal phenolate in a dry phenol and heating with sulphur in the absence of water, there being present in the mixture less than four equivalents of phenol to each equivalent of alkali phenolate, and treating the obtained sulphurized derivatives with formaldehyde and a soluble sulphite.

7. In the manufacture of new derivatives of phenols, the process which comprises heating an alkali phenolate with sulphur in the absence of water and in a non-aqueous liquid, and treating the obtained sulphurized products with a lower aliphatic aldehyde and a soluble sulphite until a sample of the reaction product when diluted with water no longer yields a precipitate on addition of an acid, and isolating the formed product from the reaction mixture.

8. In the manufacture of new derivatives of phenols, the process which comprises heating an alkali metal phenolate in the absence of water and in a non-aqueous liquid with between 1 and 2 atomic proportions of sulphur for every molecular proportion of phenol and treating the obtained sulphurized product with a lower aliphatic aldehyde and a soluble sulphite until a sample of the reaction mixture when diluted with water no longer yields a precipitate on addition of acid.

9. In the manufacture of new derivatives of phenols, the process which comprises preparing a solution of an alkali metal phenolate in a dry phenol and heating in the absence of water with between 1 and 2 atomic proportions of sulphur for every molecular proportion of the total phenol present, there being present in the mixture less than four equivalents of phenol to each equivalent of alkali phenolate, and treating the obtained sulphurized derivative with a lower aliphatic aldehyde and a soluble sulphite until a sample of the reaction product when diluted with water no longer yields a precipitate on addition of acid.

10. In the manufacture of new derivatives of phenols, the process which comprises preparing a solution of an alkali metal phenolate in a dry phenol and heating in the absence of water with between 1 and 2 atomic proportions of sulphur for every molecular proportion of total phenol present, for some hours to a temperature above 160° C. but insufficiently high to substantially decompose the desired product, there being present in the mixture less than four equivalents of phenol to each equivalent of alkali phenolate, and treating the obtained sulphurized products with formaldehyde and a soluble sulphite until a sample of the reaction product when diluted with water no longer yields a precipitate on addition of acid.

11. The process of obtaining sulphur derivatives of phenols, which comprises reacting upon a phenol with caustic alkali in the absence of added water until a substantial amount of conversion of the phenol is obtained, driving off water resulting from the reaction and reacting upon the resulting mixture with sulphur, the quantity of alkali employed being greater than approximately one-fourth of that necessary to neutralize the total phenol present in the reaction mixture.

12. The process of manufacturing new derivatives of phenols which comprises heating an alkali metal phenolate in the absence of water in a dry phenol with between one and two atomic proportions of sulphur for every proportion of the total phenol present, there being present in the mixture less than four equivalents of phenol to each equivalent of alkali phenolate.

13. As new compositions of matter, sulphur derivatives of phenols which are useful as mordants, said derivatives being soluble in water, precipitable from water solution by acid in a form soluble to some extent in organic solvents such as alcohol and acetone, said derivatives possessing the property in alkaline solution of becoming fixed on cotton practically without production of color and of fixing basic dyestuffs, and said derivatives, upon reduction, failing to yield 1-2-phenol-thiol.

14. As new compositions of matter, the alkylene or methan-sulphonic acids resulting from treating the compositions defined in claim 13 with a lower aldehyde and a soluble sulphite, said compositions of matter being soluble in water and not precipitable from a diluted aqueous solution by acid, substantially insoluble in organic solvents such as alcohol or acetone, and possessing mordanting and tanning properties.

In testimony whereof I hereunto affix my signature.

Dr. EMIL KRAUS.